United States Patent
Moodie

[15] 3,678,818
[45] July 25, 1972

[54] PHOTOGRAPHIC APPARATUS INCLUDING REMOVABLE VALIDATION PLATE

[72] Inventor: Donald E. Moodie, Nashua, N.H.
[73] Assignee: Polaroid Corporation, Cambridge, Mass.
[22] Filed: Oct. 5, 1970
[21] Appl. No.: 78,033

[52] U.S. Cl. ...........................................................95/1.1
[51] Int. Cl. .....................................................G03b 17/24
[58] Field of Search.......................................................95/1.1

[56] References Cited

UNITED STATES PATENTS 3,388,649   6/1968   Dietz.......................................95/1.1 X
3,547,015   11/1970  Dalton........................................95/1.1

OTHER PUBLICATIONS

Polaroid Corporation Advertisement, Scientific American; June, 1968, pages 70–71.

*Primary Examiner*—Samuel S. Matthews
*Assistant Examiner*—Kenneth C. Hutchison
*Attorney*—Brown and Mikulka, William D. Roberson and Robert L. Berger

[57] ABSTRACT

A removably mounted indicia unit in a camera system for making identification cards, adapted both to form an image of a subject on a sheet of photographic material and to reproduce indicia of the indicia unit, such as a validating signature, on the same sheet of photographic material. The indicia unit has a substantially light transparent plate carrying the indicia and is located at the rear of the camera. The indicia unit, in assembly in the camera system, uses a nesting assembly at one end of the unit and a resilient snap-in assembly at the other end of the unit. In illustrative embodiment, the indicia is in combination in a system for recording images of two scenes on mutually exclusive areas of a sheet of photographic material, in which system the indicia unit includes substantially light transparent polarizer filter elements as a part of the system for recording images of two scenes on mutually exclusive areas of a sheet of photographic material. In the illustrative combination, an actuating system is adapted to displace the indicia unit into and out of overlying contact with the photographic material.

26 Claims, 5 Drawing Figures

PATENTED JUL 25 1972 3,678,818

INVENTOR.
DONALD E. MOODIE
BY
*Brown and Mikulka*
ATTORNEYS

INVENTOR.
DONALD E. MOODIE

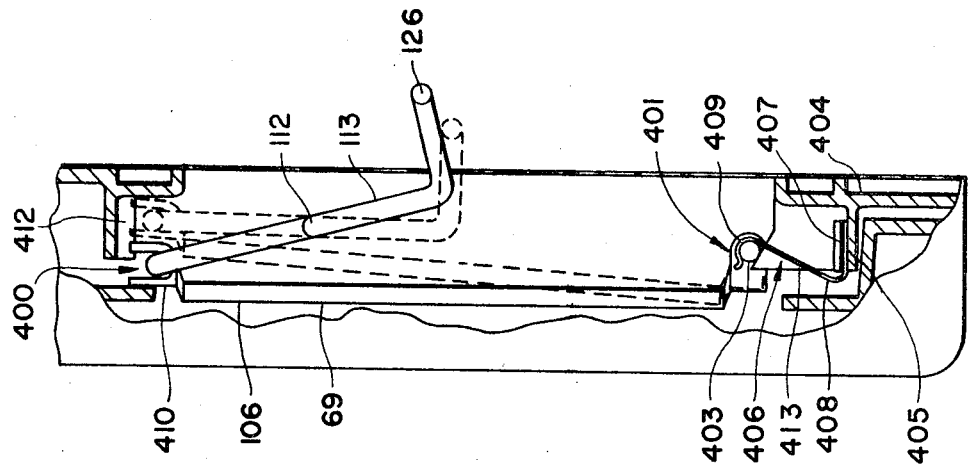
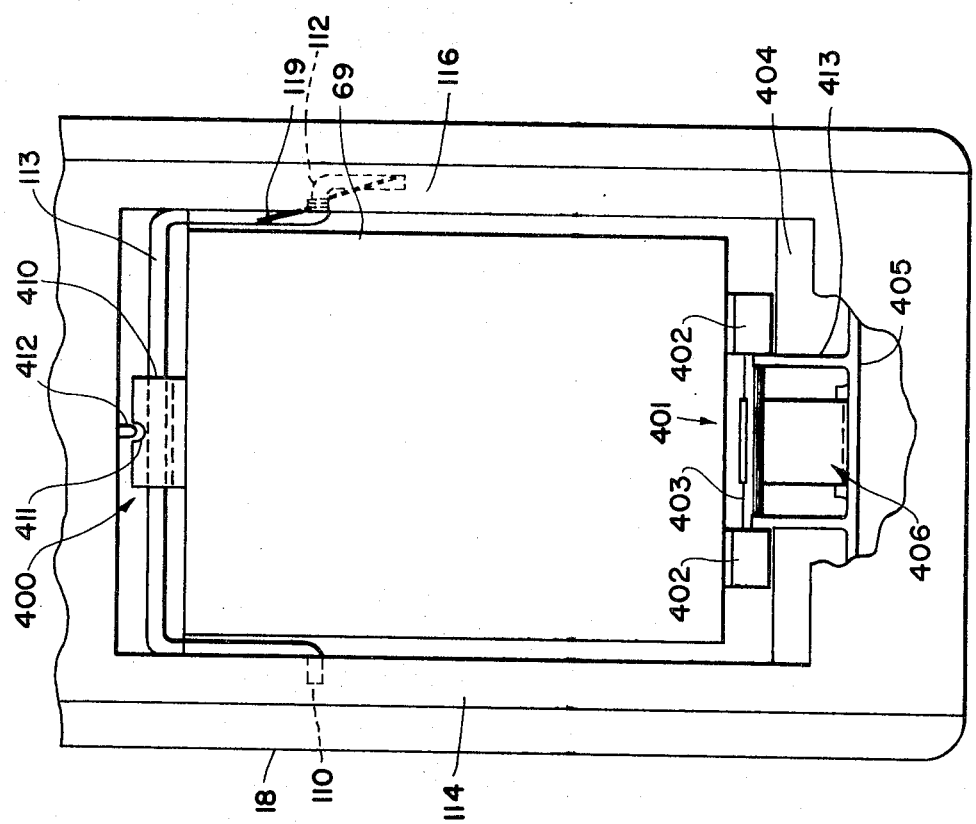

PHOTOGRAPHIC APPARATUS INCLUDING REMOVABLE VALIDATION PLATE

This invention relates to photography, and more particularly, to reproduction of indicia on photographic material, in addition to forming an image of a subject on such photographic material.

Frequently it is necessary to apply indicia to a photograph. One form of such a photograph is an image of a subject as a means of identification. Personal identification cards such as credit cards, licenses, and employee identification cards are examples. Indicia often necessary to such cards may be in the form of a validating signature of a duly constituted official, providing official validation on the photograph and thus associating the reputation and authority of a government agency, an employer, a bank, or the like, with the subject or individual of the photograph.

Of particular significance and usefulness are systems for photographic identification by simultaneous photographic reproduction of images of the subject and associated information, plus a validation signature, on a single sheet of photographic material. One such system is the Polaroid ID-2 Land Identification System presently marketed by Polaroid Corporation of Cambridge, Massachusetts.

In another system of this general type, a polarizing filter sheet is sandwiched with a validation signature sheet to form a plate which is adapted to be displaced so that it is seated against and overlies a sheet of photographic material, prior to the time the images of the subject, the associated information, and the validation signature are formed on the photographic sheet. In order to reduce the pull force which must be exerted by the operator on a tab to effect the removal of each film unit from the film holder, and further, to preclude scratching the exposed surface of the photographic sheet at such time, it is desirable that this plate be positioned out of contact with an exposed photographic sheet whenever such a sheet is being withdrawn from the film holder. Consequently, this plate is mounted within the camera system for selective displacement into and out of contact with the photographic material. This particularly significant and advantageous system for effecting such a result is set forth in copending application Ser. No. 864,632 of John F. Pasieka filed Oct. 8, 1969 and is described in greater detail therein.

A validation plate, with or without the polarizer filter sheet, presents a difficulty in that it must be safeguarded from unauthorized hands, from the possibility of theft for purposes of counterfeiting of identification cards or the like, or the possibility of loss which would require that a new signature be obtained, with consequent inconvenience to signer and obtainer alike, and the necessity of safeguards in case the lost plate is found by someone who might put it to unauthorized use.

In many camera structures, the film holder is a housing mounted on the back of the main camera body. This film holder may be integral with the main camera body, or it may be removably mounted thereon. The validation plate is usually located within the film holder housing.

In previous structures, the mounting of the validation plate is permanent. As a further possibility, such permanent mounting of the validation plate may be within the main body of the camera.

In order to safeguard the validation plate when the camera is not in use or under supervision, such as overnight, weekends, or inactive use periods, the validation plate must be in a protected place, such as a safe or security area such as a vault.

With prior structures, either the entire camera or as a minimum, the entire film holder unit must be put in such a protected place or area. This is a significant inconvenience, since space under such protection is often limited and expensive. Further, such protection often entails camera dismantling or removal from an operating situation. The care necessary to properly reestablish the camera in its proper operating situation after such a period of protection is a further difficulty which is at least an inconvenience.

This invention obviates such prior art difficulties in that simple and unique means is provided for removably mounting the validation plate, or the plate unit which also includes polarizing filters, by itself from the camera. In the illustrative embodiment of this invention, as disclosed herein, the plate unit is removably mounted in the film holder and can be removed from the camera system without the necessity of removing the film holder itself.

Accordingly, in this embodiment, the film holder housing is permanently secured to the main camera housing. A door is provided in the back of the film holder housing. The validation plate unit is passed through this door and is snapped into place within the film holder housing before a film pack is placed therein. After the film pack is removed, the validation plate unit is readily removable for safe storage in a security area or container. Security is thus obtained by using a small amount of space, and in a simple and easy manner, without need of moving and storing an entire camera, an entire film holder housing, or of disassembling an essentially permanent validation plate mounting.

The removably mounted validation plate system of this invention is applicable, with suitable mounting adaptations, to any form of camera using an indicia plate unit which needs to be safeguarded. Such an indicia plate unit is preferably established, in its operating situation, in overlying contacting relation with a sheet of photographic material such as a sheet of film in a film pack. Such contacting relation is established as resilient, either in the support of the indicia unit, the support of the film pack, or both.

In a more advanced camera structure, in order to reduce the pull force which must be exerted by the operator on a pull tab to effect the removal of each film unit from the film holder and, further, to preclude scratching the exposed surface of the photographic sheet at such a time, it is desirable that the validation plate unit be positioned out of contact with an exposed photographic sheet whenever such a sheet is being withdrawn from the film holder. Consequently, the validation plate unit is mounted within the camera ordinarily within the film holder housing, for selective displacement between a position out of contact with the photographic sheet and a position in overlying engagement with the photographic sheet. The first such position is used when a film unit is to be removed from the film holder, and the second when an image is to be formed on the photographic sheet.

Such displacement is accomplished in the course of actuation of the camera system, and a form of such accomplishment is set forth in the unique structure disclosed in copending application Ser. No. 864,632 of John F. Pasieka filed on Oct. 8, 1969.

The present disclosure includes a validation plate unit displacement system of this nature, as operated by the actuation of the camera system. In this invention, the validation plate unit is removably mounted in the camera system through a nesting pivot assembly at one end and a resilient, snap-in assembly at the other. In the operation of the displacement system, the validation plate unit is connected at the nesting assembly for such displacement by the actuation of the camera system, and pivotal movement is provided in the snap-in assembly.

As a vehicle of illustration of this invention, the camera system of the previously mentioned copending Application of John F. Pasieka is set forth schematically herein. This camera system is adapted to photographically produce an identification card having a first section on which a photograph of the subject is presented and a second section on which certain information concerning the subject and the issuing agency is presented. A validation signature is also presented on this card as a photographic image along a line of demarcation of such sections, and partially in both.

One section of this camera comprises a film holder adapted to mount a sheet of unexposed photographic material at a predetermined focal plane. A container having a light sealed entrance port serves to removably receive a data card into the camera system and to mount that data card at the appropriate location for purposes of photographing.

An image of the subject is formed on the sheet of photographic material by an objective lens-shutter element. A system including a plurality of mirrors, an objective lens and an electronic flash unit facilitates the formation of a data card image on the same sheet of photographic material. One of these mirrors is positioned in the optical path between the aforementioned lens-shutter element and the sheet of photographic material at the time of recording the data card image. This mirror is mounted within the camera system so that it may be displaced out of such optical path to facilitate the subsequent photographing of the subject.

In order to preclude light rays from the subject intersecting that section of the photographic material on which the data card image is intended to be formed and those from the data card from intersecting that section of the photographic material on which the subject's image is intended to be formed, the system employs a special arrangement of polarizing elements. Included in this special arrangement is a polarizing plate having two sections of polarizing materials, the transmission axes of these two sections being orthogonally aligned with respect to each other. One such section of the polarizing plate is adapted to overlie the section of the photographic material on which the image of the subject is intended to be formed, while the other such section of the polarizing plate is adapted to overlie the section of photographic material on which the image of the data card is intended to be formed.

This polarizing plate is sandwiched between a light transparent plate bearing the validation signature previously mentioned herein, and a second light transparent plate to form the indicia plate unit, or validation plate unit which is the removably mounted device of this invention. The position of the validation signature is optional, but may usefully be positioned so that it will be recorded in part on one of the established sections of the photographic sheet and in part on the other of such sections. Thus the validation signature extends along a line of demarcation between such sections and extends into both such sections.

In the operation of this camera system and utilizing this polarizing plate-validation plate unit, the aforementioned electronic flash unit is energized to first form an image of the data card on a first section of the sheet of photographic material. After the mirror, which is initially positioned in the optical path between the lens-shutter element associated with the subject and the sheet of photographic material, has been displaced into a position out of that optical path, the shutter of that element is activated to form an image of the subject on a second section of the sheet of photographic material.

A unique camming mechanism is employed in this system to sequentially displce the validation plate unit into contact with the sheet of photographic material, fire the electronic flash unit thereby illuminating the data card, displace the mirror out of the optical path of the lens-shutter element, to activate the shutter associated with that lens-shutter element, and to simultaneously energize the flash unit employed to illuminate the subject. The entire operation results from the action of an operation in pushing the camera system actuation button. Accordingly, such displacement of the validation plate unit is accomplished in the course of the operation of the camera system. Thus, in this invention, the validation plate unit is removably mounted in a displacement system the purpose of which is to move the validation plate unit in and out of overlying engagement with the sheet of photographic material.

An object of this invention, therefore, is to provide an improved identification card camera system.

Another primary object of this invention is to provide an improved camera system of the type indicated which includes simple and inexpensive means for removably mounting a validation plate in such camera system.

A further object of this invention is to provide an improved camera system of the type indicated which includes simple and relatively inexpensive means for removably mounting a validation plate in a validation plate displacement system in such camera system.

Another object of this invention is to provide a camera system with a removably mounted validation plate on the basis of a nesting assembly in combination with a cooperating snap-in assembly.

An additional object of this invention is to provide a camera system with a validation plate displacement system in which a validation plate is removably mounted on the basis of a nesting pivot in combination with a cooperating snap-in assembly, wherein such snap-in assembly is also pivot means for such validation plate in such displacement system.

A still further object of this invention is to provide a camera system with a removably mounted validation plate on the basis of a nesting assembly in combination with a cooperating snap-in assembly and simple means for accomplishing lateral location of the validation plate in the camera system.

Other objects and advantages of this invention will be in part apparent and in part pointed out hereinafter and in the accompanying drawings, in which:

FIG. 4 is a face view of the validation plate assembly structure, from the left, in FIG. 2; and FIG. 5 is a cut-away side view of the FIG. 4 showing.

DESCRIPTION OF A PREFERRED EMBODIMENT

Figure 1:
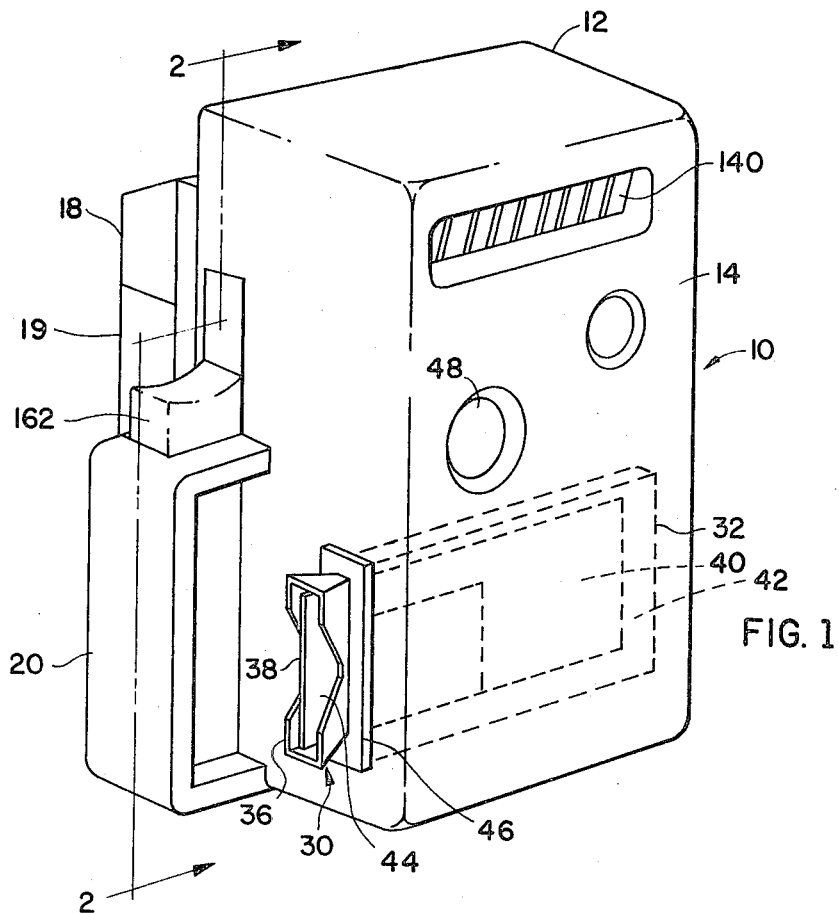
FIG. 1 is a diagrammatic, external overall perspective of a camera embodying this invention.

The illustrated preferred embodiment of this invention may be understood by first referring to FIG. 1 of the drawings which illustrates a camera system 10 capable of photographically producing identification cards depicting a photograph of the subject and certain information concerning the subject and the issuing agency and including a validation signature.

This camera system 10 comprises an opaque housing or shroud 12 including a first section 14 in which the camera's optical system is contained and a film holder 18 mounted thereon. The film holder 18 is provided with a rear door portion 19 through which the validation and polarizing plate unit, with which this invention is concerned, may be removably mounted within the camera. Extending from one side of the camera's first section 14 is a handle 20 designed to be gripped by the operator for purposes of aiming and/or supporting the camera 10 during exposure operations. Preferably, the film holder 18 is adapted to receive a film pack 22 containing a plurality of film units (see FIG. 2), which may advantageously be of the diffusion-transfer processing type, and to sequentially position the negative emulsion bearing photographic sheet 24 of each such film unit at a focal plane 26 within the camera 10. Also housed within the film holder 18 are means (not shown) for effecting the application of a processing fluid between the negative emulsion bearing sheet 24 and an image-receiving sheet of each film unit after exposure and as the film unit is withdrawn from the holder by the operator's pulling a tab 28 connected thereto. The specific forms of the film units contained in the film pack 22 do not constitute part of the present invention and, for instance, may be identical to those of such items currently being marketed.

The first section 14 of the camera system 10 also includes a data card receiving and mounting arrangement 30 which facilitates the removable insertion of a card on which certain information is imprinted into the camera for purposes of photographing same. This arrangement 30 comprises a container 32 which is mounted within the camera system 10 by a spring clip 34 (see FIG. 2) and which is provided with an elongated fluted opening 36 through which a data card 38 may be inserted thereinto. When fully inserted into the container 32, an L-shaped portion 40 of the data card on which the information is imprinted is located in a section 42 of that container so as to be properly positioned for photographing. At such time, a second portion 44 of the data card 38 is accessible exteriorly of the camera system 10 adjacent the elongated fluted opening 36 to facilitate the subsequent removal of the card from the system. The container 32 includes a light sealed chamber 46 wherein a resiliently flexible material, such as felt, is attached to one wall of the chamber and is adapted to extend across that chamber into contact with the opposite wall thereof. This arrangement permits the data card 38 to be inserted into and withdrawn from the camera system 10 without disrupting the light sealed nature of the container's section 42. An identification card camera system employing this unique type of data card receiving and mounting arrangement is the subject of copending application Ser. No. 864,630 of Donald E. Moodie filed Oct. 8, 1969 and is described in greater detail therein.

Figure 2:
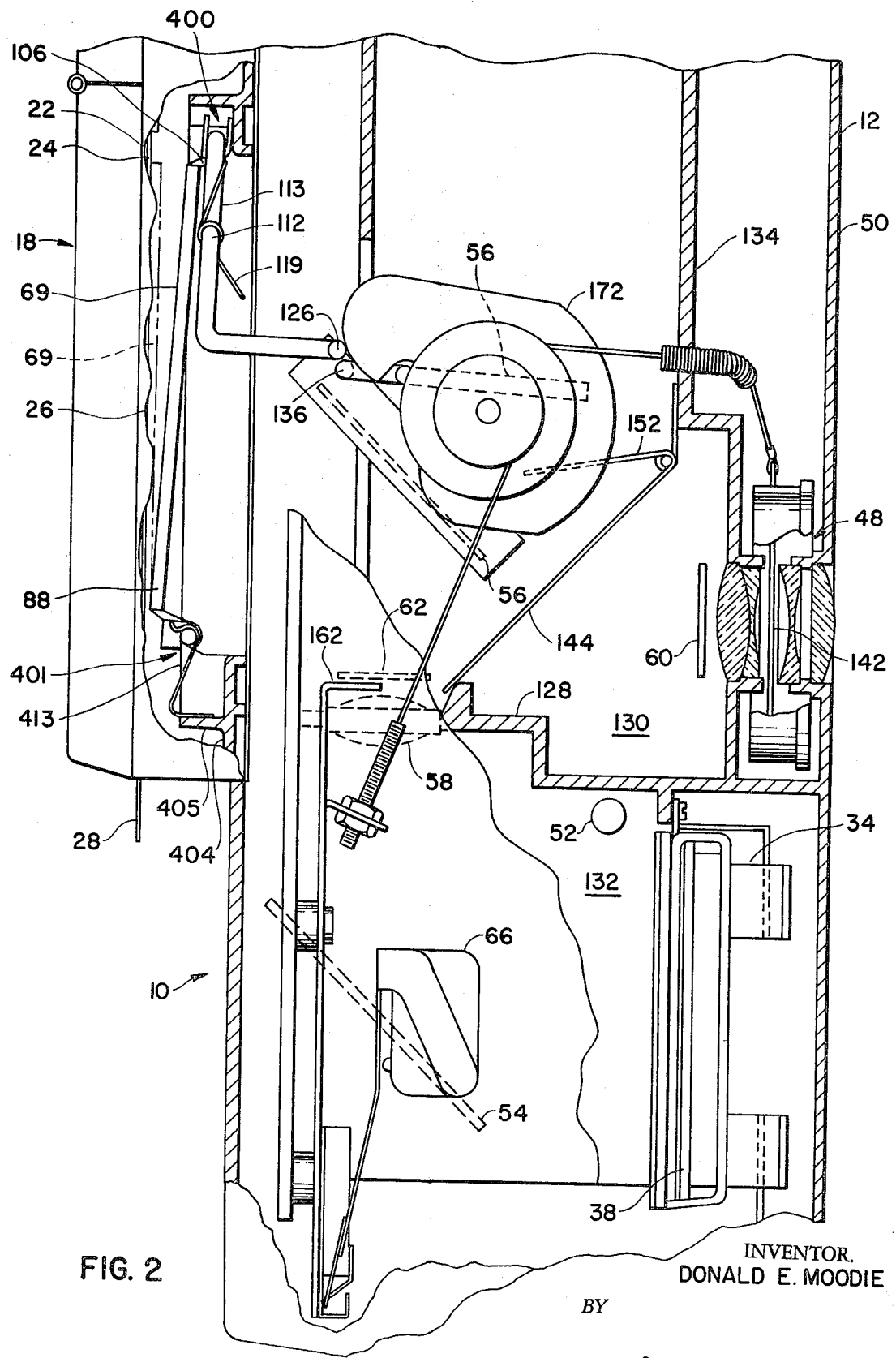
FIG. 2 is a fragmentary diagrammatic partially cutaway, partially sectional, side elevation view taken generally along line 2—2 of FIG. 1.

FIG. 2 diagrammatically illustrates the optical system housed within the section 14 of the camera 10 and the operable relationship between that optical system, the data card 38 and the sheet of photographic material 24. In this figure of the drawings, the data card 38 is shown as being positioned within the camera system 10 at the proper location for photographing purposes. It will be noted that, in this embodiment, the information appearing on the data card 38 and intended to be photographically reproduced on the photographic sheet 24 is located on the FIG. 1 generally "L-shaped" portion 40 of the card.

An objective lens-shutter element 48 is mounted in the front face 50 of the camera system 10 to facilitate the formation of an image of a subject positioned in front of the camera on a selected section of the photographic sheet 24.

It will be noted that, when mounted in the camera system 10, the data card 38 is located below both the lens-shutter element 48 and the sheet of photographic material 24. Thus, in addition to an electronic flash unit 52, which serves to illuminate the data card 38, the camera 10 employs first and second light reflecting elements (mirrors) 54 and 56 and an objective lens 58 to facilitate the formation of an image of the data card on the sheet of photographic material 24.

Mounted adjacent the objective lens-shutter element 48 so as to intercept all of the light rays from the subject passing through that element is a light polarizer 60. Similarly, a second light polarizer 62 is mounted adjacent the objective lens 58 so as to intercept all of the light rays from the data card 38 passing through that element. The transmission axes of these two polarizers 60 and 62 are orthogonally aligned with respect to each other. The flash unit 52 is energized through a conventional circuit (not shown) whenever the microswitch 66 is actuated.

Figure 3:
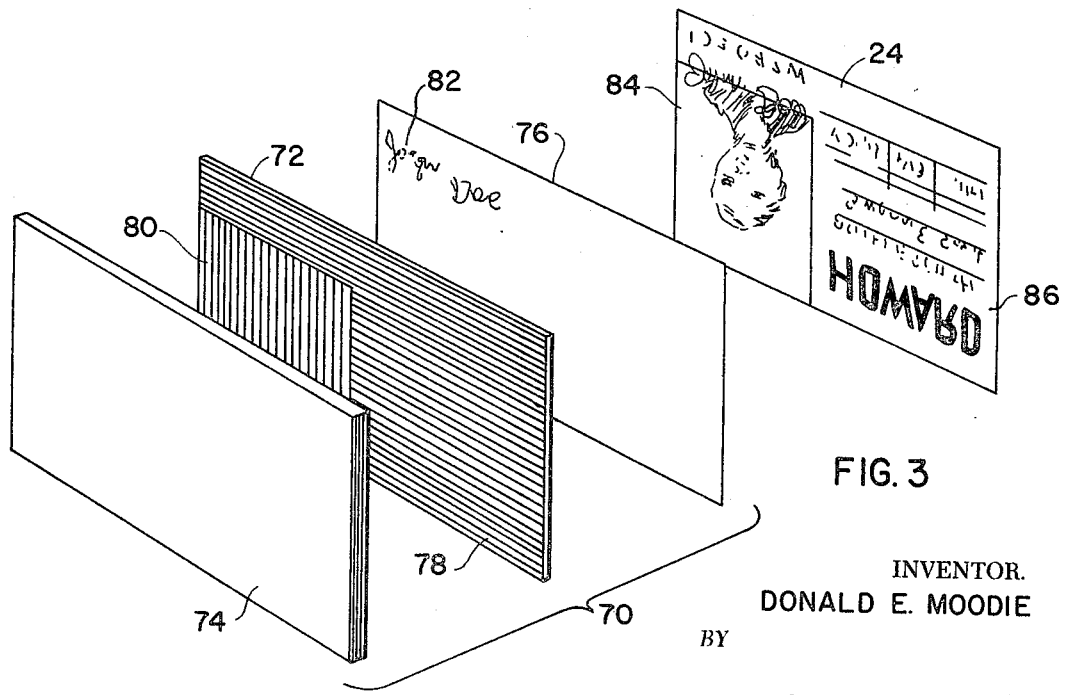
FIG. 3 is a diagrammatic exploded perspective of a section of the validation and polarizing plate forming part of the camera system of FIG. 1 and illustrating the operable relationship between that plate and a section of a sheet of photographic material mounted in such system.

As in FIG. 2, the camera system 10 is provided with a validation and polarizing plate unit 69 which is adapted to be displaced into its position shown in phantom, wherein it is seated against and overlies the sheet of photographic material 24, prior to the time the images of the data card 38 and the subject are formed on the photographic sheet. In FIG. 3 of the drawings, a section 70 of this polarizing plate 69 has been exploded to more clearly illustrate the various components of which it is formed. It should be understood that in the illustrated camera system 10, conventional means are employed to slideably mount the film holder 18 to the back of the camera system's first section 14. In this manner, two identification cards may be produced from each photographic sheet 24. Therefore, in this particular system, each plate 69 includes two such sections 70, each adapted to overlie approximately one-half of a photographic sheet 24. With the film holder 18 in its position shown in FIG. 2, the lower half of the sheet 24 may be employed to produce a first identification card. Subsequently, the film holder 18 may be slideably displaced downwardly along the back of the camera's first section 14 to bring the upper half of the sheet 24, overlaid by a second section 70 of the plate 69, into position for photographic operations.

As shown in FIG. 3, a sheet 72 of polarizing materials is sandwiched between a pair of transparent support plates 74 and 76. As indicated, the polarizing plate 69 overlies and is positioned in close proximity to the sheet of photographic material 24 when the subject and data card are being photographed. Consequently, the illustrated section of the sheet of polarizing material 72 may have approximately the same dimensions as the finished identification card. In the illustrated embodiment, this sheet 72 comprises a first generally "L-shaped" section 78 having its transmission axis aligned with that of the second light polarizer 62 and a rectangularly shaped section 80 having its transmission axis aligned with that of the light polarizer 60. The former section 78 has the same size and shape of a section 86 of the photographic sheet 24 which it is adapted to overlie and on which the data card image is intended to be recorded, while the latter section 80 has the same size and shape of a section 84 of the photographic sheet 24 which it is adapted to overlie and on which the subject's image is intended to be recorded. Conventional means may be employed to fabricate the sheet of polarizing materials 72. For instance, this sheet 72 may comprise a lamination of polyvinyl alcohol sheets, each having been stretched and molecularly oriented so as to be birefringent, appropriately dyed and printed in accordance with current techniques to provide the aforementioned sections 78 and 80 having orthogonally aligned transmission axes. Alternately, other conventional forms of polarizing sheet material may be cut, aligned and mounted on a suitable transparent support.

The support plates 74 and 76 may be formed with any suitable material, such as an acrylic lucite or a glass, and appropriately adhered to the opposed faces of the sheet 72. These support places 74 and 76 not only serve to support the sheet of polarizing materials 72 but also serve to protect that sheet from foreign matter, abrasion, etc. Importantly, the support plate 76 is provided with indicia 82, such as a validating signature, company name, trademark, or other symbol, which it is intended to photographically reproduce on the sheet of photographic material 24. In this respect, such indicia may be hot stamped in an opaque ink into a surface of the support 76. Preferably, it would be stamped into the surface of that support plate 76 intended to be mounted adjacent the sheet of photographic material 24 and at a position thereon so as to be photographically reproduced in part on the section 84 thereof and in part on the section 86 thereof. When disposed in its position shown in phantom in FIG. 2 of the drawings, the plate 69 is mounted against the sheet 24 so that the sections 78 and 80 of its sheet of polarizing materials 72 respectively overlie the sections 86 and 84 of the photographic sheet 24. To minimize any distortion of the images, it is desirable that the support plate 76 be relatively thin.

It will thus be appreciated that the polarizing plate 69, in combination with the light polarizers 60 and 62, serves to effectively limit the light rays intersecting section 84 of the sheet of photographic material 24 to those from the subject and to limit the light rays intersecting section 86 of the sheet of photographic material to those from the data card 38. Further, it is naturally desirable that light rays from the data card 38, which are polarized by the element 62, be directed effectively and efficiently onto the appropriate section 86 of the photographic sheet 24. As indicated, at the same time, it is desirable that section 80 of the sheet 72 preclude any such rays from impinging upon section 84 of the photographic sheet 24. Consequently, the polarization characteristics of such light rays should not be distorted or changed to any extent intermediate the element 62 and the sheet 72. In this respect, the alignment of the mirror 56 and the polarizing element 62 is preferably such that the transmission axis of that element is parallel to the plane of the mirror. Any deviation from this type of alignment could result in a component of the light rays being oriented parallel to the transmission axis of the section 80 of the sheet 72, whereby such component would pass through that section of the sheet 72 onto section 84 of the photographic sheet 24. This particularly advantageous system for effecting such a result is the subject of copending application Ser. No. 49,960 of Bruce K. Johnson filed June 25, 1970.

In order to reduce the pull force which must be exerted by the operator on the tab 28 to effect the removal of each film unit from the film holder 18, and further, to preclude scratching the exposed surface of the photographic sheet 24 at such time, it is desirable that the polarizing plate 69 be positioned out of contact with an exposed photographic sheet whenever such a sheet is being withdrawn from the film holder. Consequently, the validation plate 69 is mounted within the camera system 10 for selective displacement between its original position as shown in FIG. 2 of the drawings and its position as shown therein in phantom. In this connection, to be detailed later herein, one end of the validating and polarizing plate is nested as at 400 with a bail 113 as a displacement movement connection for the validation plate. The opposite end of the validation plate is mounted in a snap-in assembly 401 in pivotal relation therein to provide a pivotal axis for the displacement movement of the validation plate as effectuated through the nesting assembly 400 of the validation plate with the bail 113. It will be seen that actuation of the camera system results in part in such movement of the bail 113 as is required for suitable displacement of the validation plate unit into and out of overlying engagement with the photographic sheet 24.

The snap-in assembly is both a pivot assembly and resilient spring means to urge the end 88 of the validation plate in the direction of the sheet of photographic material 24. A spring 119 on the bail 113 provides controlled action against the other end of the plate in a direction toward the sheet of photographic material 24.

Outwardly extending arms 110 and 112 (See FIG. 4) of the bail 113 pass through circular bores appropriately provided through frame members 114 and 116, respectively, of the film holder 18. In order to continually tend to urge the upper section of the bail 113 against the top end 106 of the validation plate 69, the spring 119 is coiled around the bail 113 near the pivot form of outwardly extending arm 112. The coiled spring 119 exerts a controlled force against the validation plate 69 tending to displace that member into its position shown in phantom in FIG. 2 of the drawings. The bail's outwardly extending arm 112 makes a right angle turn in the direction away from the validation plate 69 and terminates in a cam contact end 126. It will be appreciated that, when control is applied to this contact 126 causing that member to be positioned in its location shown in FIG. 2 against the force exerted on the validation plate 69 by the spring 119, the validation plate will be positioned in spaced apart relationship to the sheet of photographic material 24. Further, if no such control is applied to the contact 126, the force exerted on the validation plate 69 by the spring 119 will cause the validation plate to be located in its position as shown in phantom in FIG. 2, in overlying engagement with the sheet of photographic material 24. This control is in the form of engagement of contact 126 with a cam 172.

The data card objective lens 58 is mounted in an opaque internal dividing wall 128, forming two separate chambers 130 and 132. The electronic flash unit 52 and the first light reflecting element 54 are located in chamber 132. The microswitch 66 for the flash unit 52 is adjacent and outside of chamber 132 and the second light reflecting element 56 is mounted within the chamber 130. At the time the data card 38 is photographed, light rays from that card are reflected by the light reflecting element 54 through the lens 58 and the light polarizer 62 onto the light reflecting element 56, which redirects those light rays towards the sheet of photographic material 24. Since at this time the light reflecting element 56 is positioned in the optical path between the objective lens-shutter element 48 and the sheet of photographic material 24, this element 56 is displaced into its up position shown in phantom in FIG. 2 subsequent to the formation of the data card image on the sheet of photographic material 24 and prior to the formation of the subject's image on that sheet. In this connection, the light reflecting element 56 is mounted for pivotal movement about a rod 136.

A second electronic flash unit 140 facilitates the photographing of a subject positioned in front of the camera. A conventional arrangement may be employed to energize the flash unit 140 whenever the shutter 142 of the objective lens-shutter element 48 is activated.

As in the case of the film holder 18, the film units contained therein and the arrangement for activating the shutter 142, the lens element 58 and the lens-shutter element 48 and the flash units 52 and 140 do not by themselves constitute a part of the present invention. Consequently, these components of the system may take conventional or special forms other than as illustrated in the drawings within the scope of the present invention.

The camera system 10 includes a non-reflective light baffle plate 144 pivotably connected to the mounting frame 134 and movable by the reflector 56. As the light reflective element 56 is rotated in a counterclockwise direction about the rod 136, it engages the arm 152 and causes the light baffle plate 144 to be displaced to overlie the reflective element 56.

The illustrated embodiment of the invention includes the unique arrangement for automatically and sequentially displacing the validation plate 69 into overlying contact with the sheet of photographic material 24, energizing the electronic flash unit 52, displacing the light reflecting element 56 into its position shown in phantom in FIG. 2 and activating the shutter 142, all in response to an operator's manipulation of a single actuating device. In this connection, a button 162 (see FIGS. 1 and 2) is conveniently mounted on the handle 20. The button 162 is movable to actuate the microswitch 66 and a cam 172. Whenever an operator depresses the button 162, the cam 172 is rotated in a clockwise direction as viewed in FIG. 2. Upon subsequent release of the button 162, suitable spring means causes the cam 172 to be returned to its original position.

The cam 172 restrains the action of spring 119 on the bail 113. When the cam is rotated in consequence of an operator pushing the button 162, the cam 172 releases the pivoted bail 113 and the spring 119 displaces the validation plate into overlying engagement with the photographic sheet 24. Upon release of the camera button, the bail 113 is again restrained by the cam through the bail extension 126, and the validation plate is again moved away from the photographic sheet, about the snap-in assembly 401 as a pivot.

Further detail of this illustrative camera system with which the removably mounted validation plate is shown in this invention is set forth in copending application Ser. No. 864,632 of John F. Pasieka filed Oct. 8, 1969.

FIGS. 4 and 5 present face and side views, respectively, of the removably mounted validation and polarizing plate set forth herein as illustrative of this invention in relation to and in combination with the camera system of FIGS. 1 through 3.

It may be noted here, that in camera systems not using polarizing structure and procedure exemplified herein, the removably mounted plate involved in this invention would be a simple, light transparent plate, with suitable indicia, such as a validation signature, thereon. The essential point is to safeguard the validation plate. However, as presented herein, such a validation plate may be sandwiched with another, such as the polarizing plate or other plates for other purposes.

To assemble, the validation plate is first entered into the nesting assembly 400, and then passed into the snap-in assembly 401. Disassembly is very easily and simply accomplished by release pressure manually applied to the snap-in assembly 401 to first free the snap-in end of the validation plate so that it may simply be drawn back and lifted out of the nesting assembly 400.

As in FIGS. 4 and 5, the validation plate 69 is rectangular and vertically disposed. At the bottom there is a pair of downwardly extending lugs 402, with a cross-bar 403 therebetween such that the cross-bar is spaced from and essentially parallel to, the bottom edge of the validation plate as seen in FIG. 4. The lugs 402 are essentially equally spaced from their adjacent side edges of the validation plate, with the cross-bar 403 thus centrally located along the bottom edge of the validation plate.

Support structure in the camera system includes a frame wall 404 from which a platform 405 extends laterally as a support base for a relatively wide strip spring 406 which comprises a foot 407 secured to the platform 405 and a freely extended resilient arm 408 which terminates within the frame area in a spring channel form 409 which receives and presses the validation plate cross-bar 403 against a wing 413 on each side of the bar 403 to complete the snap-in assembly 401 of the validation plate 69 in the camera system.

At the top of the validation plate 69, as seen in FIGS. 4 and 5, nesting assembly is accomplished through a transverse channel member 410, in essentially U-shaped cross-section, open end facing upward, and extending a significant distance across the top portion of the validation plate 69, essentially laterally centered with respect to the validation plate 69, and secured thereto so as to extend above the validation plate. The bail 113 in its top, horizontal bar form transversely disposed along and above the top edge of the validation plate 69, is received lengthwise by such U-form. As seen in FIG. 5, the bail 113 has room for movement vertically in the U-form of the channel member 410 and is relatively loosely fitted between the walls of the channel member, to facilitate entrance into, removal from, and some rotary movement in, such U-form, as well as to facilitate displacement movement of the validation plate by the bail 113 as the operational connector from the camera system.

Accordingly, release of the portion 126 of the pivoted bail 113 by movement of the cam 172 in the course of the operation of the camera, results in displacement of the validation plate to the vertical position of FIG. 5 in which it overlies and resiliently engages the (FIG. 2) photographic sheet 24.

In furtherance of the assembly and repeatable location of the validation plate 69 in the camera system, the top channel member 410 is provided with a central, front to back, FIG. 4, recess 411. On the support frame above the validation plate 69, a depending tongue 412 is provided, front to back, FIG. 4. The tongue 412 lies in the recess 411 as a location for the validation plate laterally thereof. The tongue 412 extends back sufficiently to remain in the recess 411 throughout the extent of the displacement of the validation plate 69 toward and away from the photographic sheet 24.

Thus, assembly of the validation plate 69 is accomplished by slipping the top channel member 410 over the bail 113, with the tongue 412 in the recess 411. Then the bottom of the validation plate is moved in by pivoting the top channel member 410 on the bail 113, to snap the cross-bar 403 into the spring channel form 409 and against the extended portions of the wings 413.

The nesting assembly is a pivot structure both for assembly and disassembly of the validation plate, and when needed for displacement of the validation plate. The snap-in assembly is a pivot structure when needed for displacement of the validation plate.

Therefore, this invention provides a removably mounted validation plate unit in such simple and easily handled structure as to make practical the security storage of such validation plates in times of shut down or non-use of the camera system.

This invention accordingly provides a validation plate system based on the combination of nesting and snap-in assemblies which significantly reduces the possibility of expense and inconvenience of loss and replacement of validation plates, by theft or otherwise, as well as the dangers of possible proliferation of unauthorized use of such plates.

As many embodiments may be made of the above invention, and as changes may be made in the embodiment set forth above without departing from the scope of the invention, it is to be understood that all matter set forth hereinbefore and in the accompanying drawings is to be interpreted as illustrative only and not in a limiting sense.

I claim:

1. For use in a camera system as a part of means for photographically reproducing indicia on photographic material, the improvement comprising:
a substantially light transparent plate unit;
said unit comprising a substantially light transparent plate, indicia carried by said plate, and mounting means for incorporating said unit into a camera system;
said mounting means comprising means at one end of said light transparent plate for cooperating with complementary mounting means of such system to provide a releasable pivotal snap-in connection therebetween.

2. The improvement of claim 1 wherein said mounting means additionally comprises means at the opposite end of said light transparent plate for cooperating with complementary mounting means of such system to provide a releasable pivotal connection between said unit and such system.

3. The invention of claim 1 wherein said mounting means additionally includes means for laterally locating said unit within such camera system.

4. The invention of claim 3 wherein said laterally locating means is located on said means disposed at said one end of said light transparent plate.

5. For use in a camera system, as a part of means for photographically reproducing indicia on photographic material;
a substantially light transparent plate unit;
said unit comprising a substantially light transparent plate, indicia carried by said plate, and mounting means for incorporating said unit into a camera system;
said mounting means comprising a channeled member at one end of said light transparent plate for receiving a mounting bar and a mounting cross-bar at the other end of said light transparent plate for mounting in a resilient receptor.

6. The light transparent plate unit of claim 5 wherein said channelled member comprises a main channel for receiving a mounting bar, and a transverse channel for receiving a locater finger for laterally locating said plate unit.

7. A camera system comprising:
means for mounting a sheet of photographic material;
means for forming an image of identification on such sheet of photographic material;
means for photographically reproducing validation indicia on such sheet of photographic material in association with such identification image;
such indicia reproducing means including a substantially light transparent plate carrying said validation indicia; and
means for removably mounting said light transparent plate within said camera system at a predetermined position for purposes of photographing said validation indicia, said means for removably mounting said light transparent plate including a nesting pivot assembly at one end of said plate and a snap-in assembly at the other end of said plate.

8. A camera system comprising:
means for mounting a sheet of photographic material;
means for forming an image of identification on such sheet of photographic material;
means for photographically reproducing validation indicia on such sheet of photographic material in association with such identification image;
such indicia reproducing means including a substantially light transparent plate carrying said validation indicia; and
means for removably mounting said light transparent plate within said camera system at a predetermined position for purposes of photographing said validation indicia, said plate mounting means comprising complementary elements on one end of said light transparent plate and cooperating structure of said camera system to provide a resilient pivotal snap-in assembly therebetween.

9. The system of claim 8 wherein said light transparent plate is removably mounted in a displacement system for moving said light transparent plate in and out of overlying engagement with said sheet of photographic material.

10. A camera system of the self-developing type comprising:
a first section including means for forming an image of a subject at a focal plane;
a second section attached to said first section and including means for mounting a sheet of photographic material at said focal plane and for spreading a processing fluid across said sheet after exposure thereof;
means on said second section for permitting access thereinto;
means for photographically reproducing indicia on such sheet of photographic material including a substantially light transparent plate carrying said indicia; and
means for removably mounting said light transparent plate at a predetermined position within said camera system where it is accessible through said access means for purposes of photographically reproducing said indicia, said plate mounting means comprising complementary elements on one end of said light transparent plate and one of said first and second sections to provide a resilient pivotal snap-in assembly therebetween, whereby an operator may selectively manually remove said light transparent plate from said camera system through said access means without otherwise disassembling said camera system.

11. The system of claim 10 wherein said predetermined position is one for overlying engagement of said light transparent plate with such sheet of photographic material.

12. The system of claim 10 additionally comprising means for displacing said indicia plate from a position for overlying engagement of said light transparent plate with such sheet of photographic material to a position in which such photographic material is free of such engagement.

13. The system of claim 10 additionally comprising means for displacing said indicia plate from a position for overlying engagement of said light transparent plate with such sheet of photographic material to a position in which such photographic material is free of such engagement, and
means for actuating said camera system; said means for displacing said indicia being included in said means for actuating said camera system.

14. The system of claim 10 additionally comprising means for actuating said camera system to essentially simultaneously form said subject image and photographically reproduce said indicia; and
means for displacing said indicia plate with respect to such sheet of photographic material as mounted in said camera system;
said means for displacing said indicia plate being included in said means for actuating said camera system.

15. The system of claim 10 wherein said subject image is formed and at least a part of said indicia is photographically reproduced, essentially simultaneously.

16. The system of claim 10 wherein said indicia reproduction means is located to partly overlie said subject image.

17. The system of claim 10 wherein said subject image is formed and at least a part of said indicia is photographically reproduced, essentially simultaneously, with said indicia reproduction located to at least partly overlie said subject image.

18. The system of claim 10 wherein said indicia is a validating signature.

19. A camera system of the self-developing type comprising:
a first section including means for forming an image of a subject at a focal plane;
a second section attached to said first section and including means for mounting a sheet of photographic material at said focal plane and for spreading a processing fluid across said sheet after exposure thereof;
means on said second section for permitting access thereinto;
means for photographically reproducing indicia on such sheet of photographic material including a substantially light transparent plate carrying said indicia; and
means for removably mounting said light transparent plate at a predetermined position within said camera system where it is accessible through said access means for purposes of photographically reproducing said indicia, said plate mounting means comprising a nesting arrangement operably associated with one end of said light transparent plate and a resilient snap-in assembly operably associated with the opposite end thereof, whereby an operator may selectively manually remove said light transparent plate from said camera system through said access means without otherwise disassembling said camera system.

20. A system for recording images of two scenes on mutually exclusive areas of a sheet of photographic material, comprising:
an objective lens adapted to form an image of one of such scenes on such sheet of photographic material;
first means for forming an image of the other of such scenes on such sheet of photographic material;
second means for limiting the light rays intersecting a first such area of such sheet of photographic material to those from such one scene and for limiting the light rays intersecting a second such area of such sheet of photographic material to those from such other scene;
a substantially light transparent plate unit including said second means in the form of polarizer filter elements;
third means for photographically reproducing indicia on such sheet of photographic material including indicia carried by said plate unit;
said plate unit being mounted for displacement between a first position spaced from such sheet of photographic material into a second position in contact with and overlying said sheet of photographic material;
fourth means for actuating said system;
said fourth means including connections for accomplishing said displacement of said plate unit, and
fifth means for removably assembling said plate unit in said displacement mounting therefor;
said fifth means comprising a nesting assembly at one edge of said plate and a resilient snap-in assembly at the edge of said plate opposite said nesting assembly.

21. The system of claim 20 where said nesting assembly includes a means for locating said plate along a line in a direction transversely of a center line between said edges of said plate.

22. The system of claim 20 wherein said nesting assembly comprises a trough device, a rod located in said trough device, a slot formation transversely of said trough device, and a finger disposed in said slot to laterally locate said light transparent plate.

23. The system of claim 20 where said nesting assembly comprises a trough mounted on said plate, a rod located in said trough and forming a part of said actuation connections in said fourth means, a slot formation transversely of said trough device, and a finger as part of the support structure of said system and disposed in said slot to locate said light transparent plate along said rod.

24. A camera system of the self-developing type comprising:
a first section including means for forming an image of a subject at a focal plane;
a second section attached to said first section and including means for mounting a sheet of photographic material at said focal plane and for spreading a processing fluid across said sheet after exposure thereof;
means on said second section for permitting access thereinto;
means for photographically reproducing indicia on such sheet of photographic material including a substantially light transparent plate carrying said indicia; and
means for removably mounting said light transparent plate at a predetermined position within said camera system where it is accessible through said access means for purposes of photographically reproducing said indicia, said plate mounting means comprising a nesting assembly at one edge of said plate and a resilient, pivotal snap-in assembly at the edge of said plate opposite said nesting assembly, whereby an operator may selectively manually remove said light transparent plate from said camera system through said access means without otherwise disassembling said camera system.

25. The system of claim 24 wherein said nesting assembly includes means for lateral location of said plate.

26. The system of claim 24 wherein said nesting assembly comprises an arm in a trough, with said arm mounted on one of said plate and a support body in said camera system, and said trough mounted on the other of said plate and support body, and a detent and slot combination for lateral location of said plate, said detent provided on one of said plate and said support body and said slot provided on the other of said plate and said support body.

* * * * *